H. B. HOVLAND.
APPARATUS FOR METALLURGICAL AND OTHER PURPOSES.
APPLICATION FILED FEB. 2, 1918.
1,345,596.
Patented July 6, 1920.
3 SHEETS—SHEET 1.
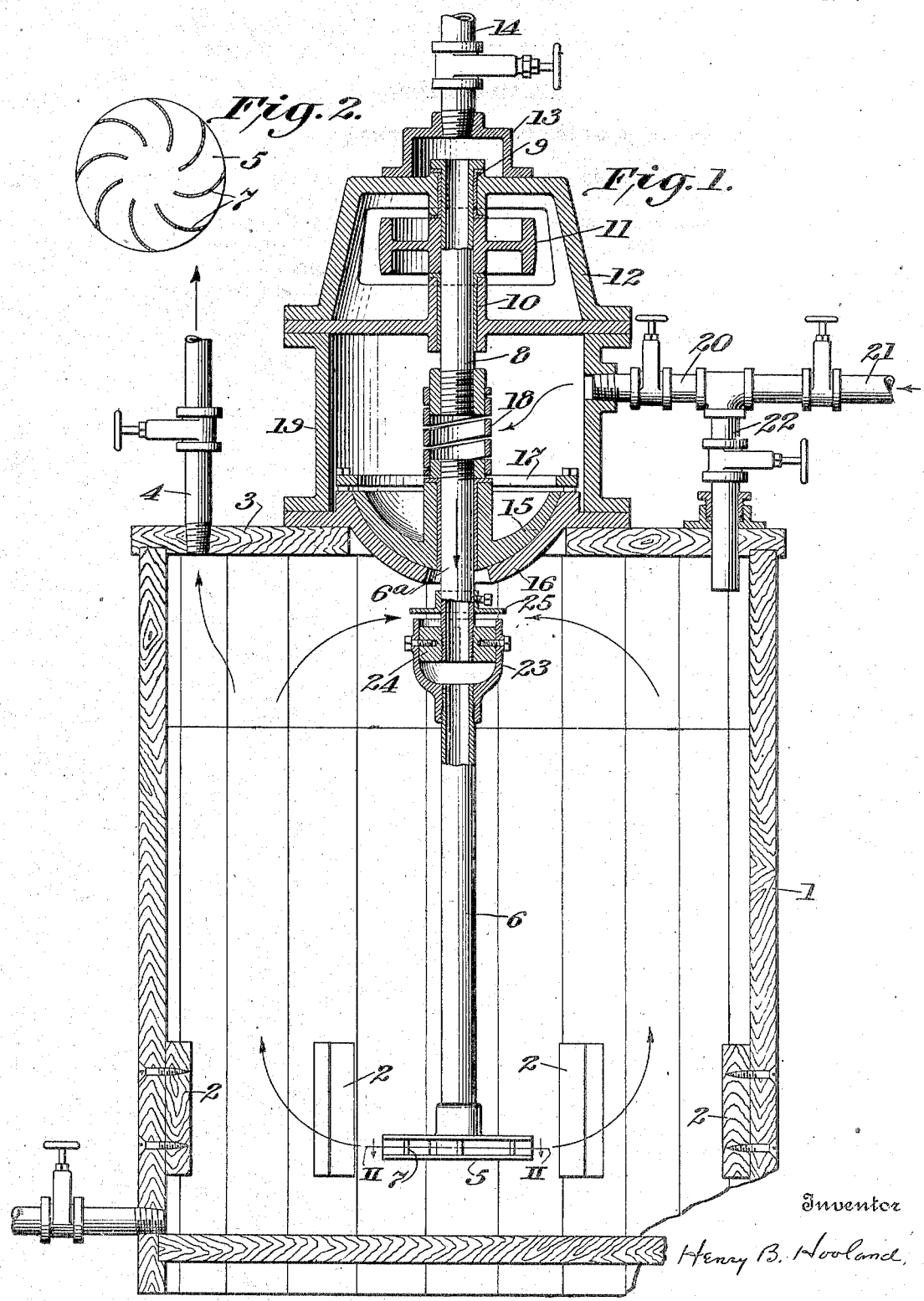

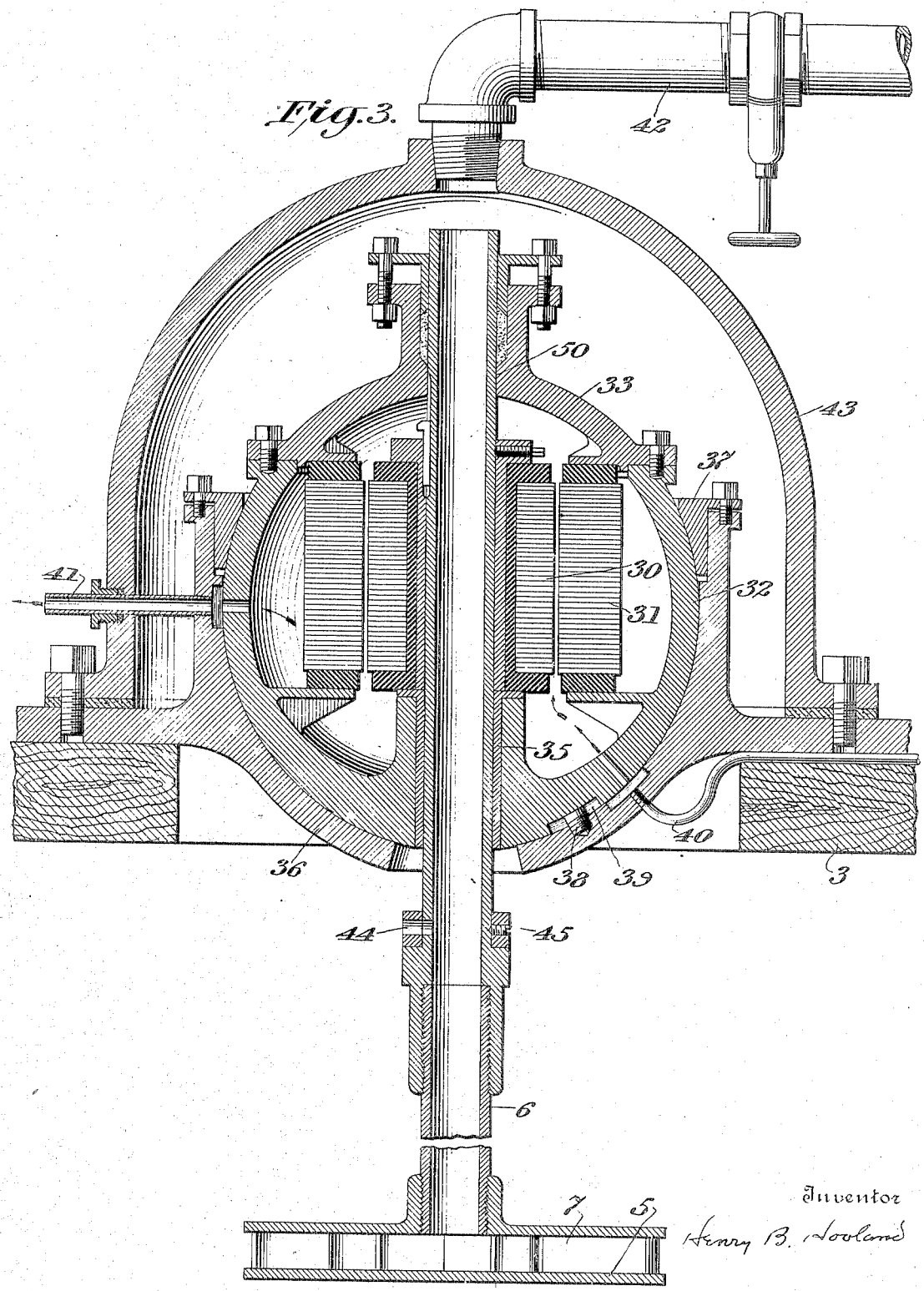

H. B. HOVLAND.
APPARATUS FOR METALLURGICAL AND OTHER PURPOSES.
APPLICATION FILED FEB. 2, 1918.
1,345,596.
Patented July 6, 1920.
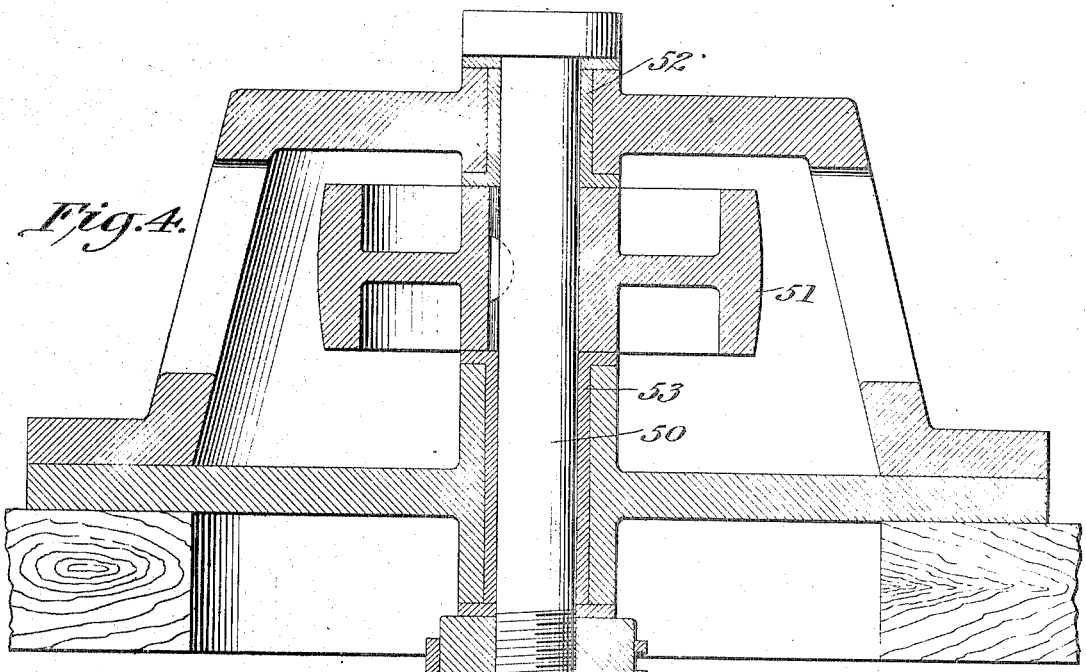
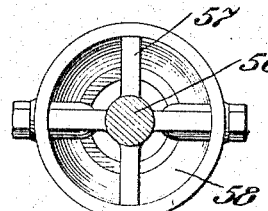
Fig.5.
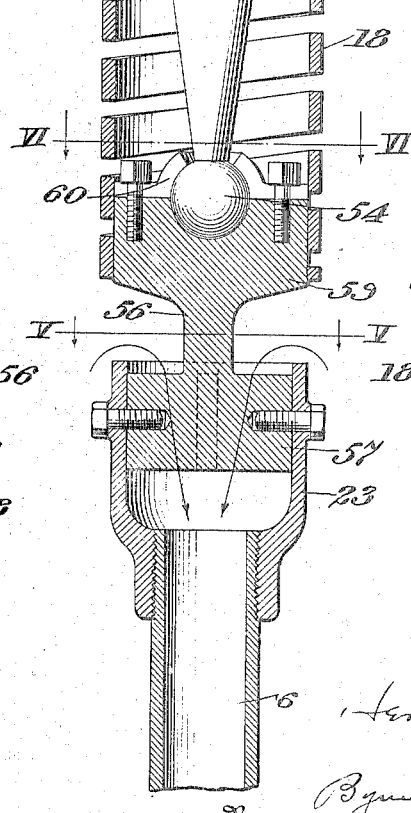
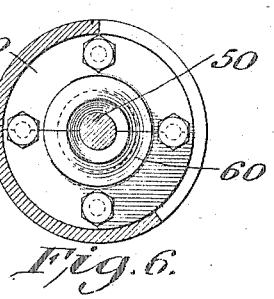
Fig.6.
Inventor
Henry B. Hovland
By Byrnes Townsend & Beckenstein
Attorneys

UNITED STATES PATENT OFFICE.

HENRY B. HOVLAND, OF ZUMBROTA, MINNESOTA.

APPARATUS FOR METALLURGICAL AND OTHER PURPOSES.

1,345,596.      Specification of Letters Patent.      Patented July 6, 1920.

Application filed February 2, 1918. Serial No. 215,161.

*To all whom it may concern:*

Be it known that I, HENRY B. HOVLAND, a citizen of the United States, residing at Zumbrota, in the county of Goodhue and State of Minnesota, have invented certain new and useful Improvements in Apparatus for Metallurgical and other Purposes, of which the following is a specification.

This invention relates to apparatus for use in the chemical and metallurgical arts, and more particularly for effecting a thorough agitation of liquids or mixtures, and for bringing gases, including air, into intimate contact with liquids, or with suspensions of solids in liquids. For example, the apparatus may be used for such diverse purposes as the treatment of ore pulps with sulfur dioxid or other reactive gases, for the flotation of ores, etc.

A characteristic feature of the apparatus in its preferred embodiment is the provision of a rotatable agitator or beater having a pendulous mounting, whereby the agitator shaft or equivalent element, although carried by a fixed support, is to a certain extent free to depart or swing from what may be termed its normal axis of rotation, whereby heavy strains and excessive wear upon fixed bearings are largely relieved. In case it is desired to effect an intimate contact between a liquid and a gas, or between two liquids, or to establish a definite movement or flow of a fluid, (liquid or gas), or for similar purposes, the agitator shaft is preferably made tubular and is provided at its lower portion with a fluid-distributer, whereby certain important advantages are secured.

Certain typical embodiments of the apparatus are illustrated in the accompanying drawings, wherein—

Figure 1 is a central vertical sectional view of one form of apparatus embodying my invention;

Fig. 2 is a horizontal section on line II—II of Fig. 1;

Fig. 3 is a modified construction of a pendulous agitator, in central vertical section;

Fig. 4 is a similar view of the upper portion of another modification;

Fig. 5 is a transverse section on line V—V of Fig. 4; and

Fig. 6 is a transverse section on line VI—VI of Fig. 4.

Referring to Fig. 1, 1 represents a vessel for containing a liquid, pulp, or suspension, and is illustrated as provided with internal vertical strips 2 to prevent swirling of the contents. The vessel may be provided with a cover 3 and a valved gas outlet 4. Within the vessel is an agitator or stirring device, which in the particular form chosen for illustration comprises a fluid-distributer 5 of the turbine type, carried by a tubular agitator shaft 6. 7 (Fig. 2) represents one form of turbine blade.

8 is a driving shaft, also illustrated as tubular, carried in upper and lower bearings 9, 10, and adapted to be driven by any appropriate means, typified by a pulley 11. As shown the driving shaft traverses a casing 12 which is surmounted by a cap 13 carrying a valved inlet pipe 14. In this case, therefore, a direct passage for gas is provided from the inlet 14 through the tubular driving and agitator shafts 8 and 6 to the fluid-distributer 5. When the shaft is rotated at an appropriate speed a gas supplied at 14 is drawn downwardly to the distributer 5 and is ejected in the form of bubbles into the liquid. A properly constructed device, operating at a sufficient speed, is capable of delivering enormous volumes of gas below the surface of a liquid or suspension. The gas-volume so delivered is dependent, for a given type of construction, upon the speed of rotation of the agitator shaft, and is, therefore, readily controllable. For some purposes, speeds of 1500–2000 R. P. M. and upward are desirable.

As is well known the wear upon fixed bearings due to the rotation of a heavy agitator is extremely severe. I have found that this difficulty may be minimized by such mounting of the agitator that it is capable of a pendulatory movement; or in other words, the agitator proper is free to rotate upon an axis which need not coincide absolutely with the axis of the driving shaft. This result may be attained through numerous constructions. For example as illustrated in Fig. 1 the agitator shaft 6 carries an approximately hemispherical support 15, which rests upon a fixed, conformed supporting plate 16, secured to the cover 3 of the container 1, whereby the agitator shaft is permitted a pendulatory movement, the extent of which may be limited by any appropriate means, as for example a fixed stop-ring 17. In order, however, to permit this pendulatory movement of the agitator shaft it is necessary to provide a flexible or yielding connection with the fixed driving shaft. In the particular construction illustrated in Fig. 1 this is done by the provision of a helical spring member 18. It will be understood, however, that this spring may be replaced by any device capable of accomplishing the same function, for example, any suitable type of universal joint.

One advantage involved in the use of a connector of the helical spring type is that access is thereby afforded to the interior of the agitator shaft, when this is tubular. For example, the spring connector 18 is illustrated in Fig. 1 as inclosed by a casing 19 to which air or gas may be admitted through the valved inlet 20, this gas being delivered either from any external source by pipe 21, or from the upper portion or gas-space of the container 1, as by pipe 22. In the latter case, it will be seen that a positive and repeated circulation of a body of gas is readily maintained through the apparatus; and if desired additional gas may, of course, be introduced to compensate for absorption, to establish a definite movement through the system, etc. For example, a plurality of similar vessels may be so connected that the exit of each communicates with the inlet of the next in series, in such manner that the gas flows through the series in a definite and regulated manner. It will thus be seen that the construction lends itself to an exceptionally wide variety of uses which it is unnecessary to describe further.

For certain purposes a more localized circulation of a gas or other fluid is desirable, and this is readily arranged by providing an inlet or inlets to the tubular agitator shaft within the container 1. For example, as illustrated in Fig. 1, the lower section of the agitator shaft 6 carries at its upper end a cup-shaped member 23 which is secured through a cross-shaped member 24 to the lower end of the upper shaft section 6ª. There is thereby provided an inlet to the fluid-distributer at this point. 25 represents a disk or other suitable closure adjustable on the shaft 6ª to control the aperture as may be desired, or to close it entirely. Obviously, any other construction accomplishing the same result may be used, but that described affords the advantages that an unrestricted communication may be provided with the interior of the agitator shaft, and that the lower shaft section is quickly replaceable.

In the modified construction illustrated in Fig. 3, 30 represents the revolving armature and 31 the fixed field coils of an electric motor, both mounted within a substantially spherical casing 32 having a detachable cover portion 33. The agitator shaft 6, which may be tubular as shown, is rigidly secured within the armature 30 and rotates therewith, being carried in upper and lower bearings 34, 35, the bearing 34 assuming the form of a stuffing box. The casing 32 is carried by the conformed supporting plate 36, and is capable of limited movement thereon, the parts constituting in effect a supporting bearing for the agitator shaft of the ball and socket type. 37 is an annular retaining ring for the motor casing, serving also to limit the pendulatory movement of the agitator. 38 is a stop which coacts with the recess 39 in the motor casing and serves to prevent the latter from revolving within its support 36. 40, 41 represents induction and eduction pipes for air for cooling the motor. 42 is a valved inlet pipe communicating with an external casing 43, and permitting the supply of gas thereto and thence to the interior of the tubular shaft 6. 44 represents another inlet to the shaft 6 capable of being closed by rotation of the encircling ring 45.

It will be observed that although in this construction there is no yielding connection between driving and driven shafts, the construction, nevertheless, affords the same positive support for a revolving agitator shaft, while at the same time permitting it limited freedom to depart from its normal axis of rotation.

A further modification is illustrated in Figs. 4, 5 and 6, which construction also illustrates one way in which my improved device may readily be adapted to existing stirrers or beaters. In this construction 50 represents a driving shaft provided with a pulley 51 and mounted in fixed bearings 52, 53. The driving shaft 50 is tapered at its lower end and terminates in a ball 54 which may be integral with the shaft. The agitator shaft 6, which may be tubular as shown, carries a cup-shaped member 23 within which is securely fastened a coupling-block or member 56. This block comprises a lower cross-shaped member 57 lying within the cup 23 and providing between its cross arms apertures 58 (Fig. 5) for the inflow of fluid; and an upper member 59 which receives the ball 54 and provides therewith, in conjunction with the retaining member 60, a ball and socket joint. There is, therefore, provided in this case also a mounting permitting a pendular movement of the agitator shaft. As in Fig. 1 the driving connection between the shafts 50 and 6 is the substantial helical spring member 18.

It will be obvious to those skilled in the art that the constructions above described may be modified in various ways without departing from my invention, which contemplates broadly the provision of a pendulous agitator of the rotary type.

I claim:—

1. Apparatus of the character described, comprising a vertical self-centering agitator shaft normally revoluble about a fixed axis, means for permitting a pendulatory movement thereof, means for restraining such pendulatory movement, and means for rotating the shaft.

2. Apparatus of the character described, comprising a vertical self-centering agitator shaft normally revoluble about a fixed axis, means for permitting a pendulatory movement thereof in different directions, means for restraining such pendulatory movements, and means for rotating the shaft.

3. Apparatus of the character described, comprising a vertical self-centering agitator shaft normally revoluble about a fixed axis, means for permitting a pendulatory movement thereof in different directions, means for restraining such pendulatory movements, means for limiting the extent of movement, and means for rotating the shaft.

4. Apparatus of the character described, comprising a pendulous agitator having a tubular shaft, a fluid-distributer carried thereby, and means for rotating said shaft.

5. Apparatus of the character described, comprising a pendulous agitator having a tubular shaft, a fluid-distributer carried thereby, means for rotating said shaft, and means for limiting the pendulatory movement.

6. Apparatus of the character described, comprising a driving shaft, a tubular agitator shaft, a fluid-distributer carried by said agitator shaft, and a yielding member coupling said driving and agitator shafts.

7. Apparatus of the character described, comprising a driving shaft, a tubular agitator shaft, a fluid-distributer carried by said agitator shaft, and a yielding member coupling said driving and agitator shafts, said yielding member constructed to afford communication with the interior of the agitator shaft.

8. Apparatus of the character described, comprising a driving shaft, an agitator shaft, a support for said agitator shaft permitting a pendulatory movement thereof, and a yielding member coupling said driving and agitator shafts.

9. Apparatus of the character described, comprising a driving shaft, a tubular agitator shaft, a fluid-distributer carried thereby, a support for said agitator shaft permitting a pendulatory movement thereof, and a yielding member coupling said driving and agitator shafts.

10. Apparatus of the character described, comprising a tubular driving shaft, a tubular agitator shaft, a fluid-distributer carried thereby, a support for said agitator shaft permitting a pendulatory movement thereof, and a yielding member coupling said driving and agitator shafts.

11. Apparatus of the character described, comprising a tubular driving shaft, a tubular agitator shaft, a fluid-distributer carried thereby, a support for said agitator shaft permitting a pendulatory movement thereof, and a yielding member coupling said driving and agitator shafts, said yielding member constructed to afford communication with the interior of the agitator shaft.

12. Apparatus of the character described, comprising a tubular agitator shaft, a fluid-distributer carried thereby, an aperture communicating with the interior of the shaft above said distributer, and an adjustable closure for said aperture.

13. Apparatus of the character described, comprising a closed container having a fluid-outlet, a tubular agitator shaft therein, a fluid-distributer carried by said shaft, means for admitting fluid to the interior of the shaft, and means for rotating the agitator and thereby establishing a flow of the fluid through the container.

14. Apparatus of the character described, comprising a closed container having a fluid-outlet, a tubular agitator shaft therein, a fluid-distributer carried by said shaft, adjustable means for admitting fluid to the interior of the shaft, and means for rotating the agitator and thereby establishing a flow of the fluid through the container.

In testimony whereof I affix my signature.

HENRY B. HOVLAND.